(12) United States Patent
Wu

(10) Patent No.: US 11,483,748 B1
(45) Date of Patent: Oct. 25, 2022

(54) METHOD AND APPARATUS FOR MANAGING HANDOVERS IN WIRELESS COMMUNICATION SYSTEM

(71) Applicant: Nanning FuLian FuGui PRECISION INDUSTRIAL CO., LTD., Nanning (CN)

(72) Inventor: Zheng-Xian Wu, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

(21) Appl. No.: 17/328,254

(22) Filed: May 24, 2021

(51) Int. Cl.
*H04W 36/00* (2009.01)
*H04W 36/08* (2009.01)
*H04L 1/00* (2006.01)
*H04W 72/04* (2009.01)
*H04W 36/22* (2009.01)

(52) U.S. Cl.
CPC ....... *H04W 36/0088* (2013.01); *H04L 1/0003* (2013.01); *H04L 1/0009* (2013.01); *H04W 36/0058* (2018.08); *H04W 36/00837* (2018.08); *H04W 36/08* (2013.01); *H04W 36/22* (2013.01); *H04W 72/0486* (2013.01)

(58) Field of Classification Search
CPC ..... H04W 36/30; H04W 36/18; H04W 36/08; H04W 76/38; H04W 36/00; H04W 36/0088; H04W 36/0083; H04W 36/0016; H04W 36/00837; H04W 36/0058; H04W 36/22; H04W 72/048; H04L 1/0003; H04L 1/0009
See application file for complete search history.

(56) References Cited

U.S. PATENT DOCUMENTS

| | | | |
|---|---|---|---|
| 11,109,287 B2* | 8/2021 | Han | H04W 28/16 |
| 2009/0046573 A1* | 2/2009 | Damnjanovic | H04J 11/0093 370/216 |
| 2010/0227614 A1* | 9/2010 | Chun | H04W 36/02 455/436 |
| 2013/0028093 A1 | 1/2013 | Cho et al. | |
| 2013/0130693 A1* | 5/2013 | Salvador | H04W 48/20 455/437 |
| 2019/0223071 A1* | 7/2019 | Yang | H04W 36/0058 |
| 2020/0022042 A1* | 1/2020 | Yin | H04W 36/00837 |
| 2020/0396658 A1* | 12/2020 | Szilagyi | H04W 36/0079 |
| 2021/0345215 A1* | 11/2021 | Sun | H04W 36/00837 |
| 2021/0377830 A1* | 12/2021 | Jin | H04W 4/40 |

FOREIGN PATENT DOCUMENTS

| | | |
|---|---|---|
| EP | 3253120 A1 | 12/2017 |
| WO | 2020/125056 A1 | 6/2020 |

* cited by examiner

*Primary Examiner* — Dung Hong
(74) *Attorney, Agent, or Firm* — ScienBiziP, P.C.

(57) ABSTRACT

A method for controlling and managing handovers between base stations in adjoining cells in wireless communications enables a user equipment (UE) to report a bit error rate (BER) to a base station having current conduct of communication with the UE. If the BER is greater than a predetermined value, the base station having conduct further determines whether the UE satisfies a handover condition over a period of time and hands conduct over to another base station if the UE satisfies the handover condition for the period of time and if the other base station is not already operating at capacity. An apparatus for controlling and managing handovers is also disclosed.

8 Claims, 3 Drawing Sheets

METHOD AND APPARATUS FOR MANAGING HANDOVERS IN WIRELESS COMMUNICATION SYSTEM

FIELD

The subject matter herein generally relates to wireless communications, and more particularly, to a method for managing handovers, and an apparatus thereof.

BACKGROUND

In a fourth generation (4G) wireless communication system, an evolved Node-B (eNB) may utilize proper adaptive modulation and coding (AMC) technology to determine an appropriate modulation and coding scheme to communicate with an user equipment (UE) and the number of resource blocks that are allocated to the UE. If the signal quality of 4G radio access technology (RAT) is poor, the system will be switched to third generation (3G) RAT or may be handed over (there may be a handover) to another base station. This method has been applied to the next-generation 5G wireless communication system.

However, the method is not suitable for the 5G wireless communication system. Since the advent of the IoT, there is a shortage of 4G resource blocks, if the system triggers a handover of the UE from a next generation Node-B (gNB) to an eNB based on signal power levels only, the handover may affect the overall throughput due to there being insufficient resource blocks of 4G.

To manage handovers in 4G/5G networks, solutions are needed.

BRIEF DESCRIPTION OF THE DRAWINGS

Implementations of the present technology will now be described, by way of embodiment, with reference to the attached figures, wherein.

DETAILED DESCRIPTION

Figure 1:
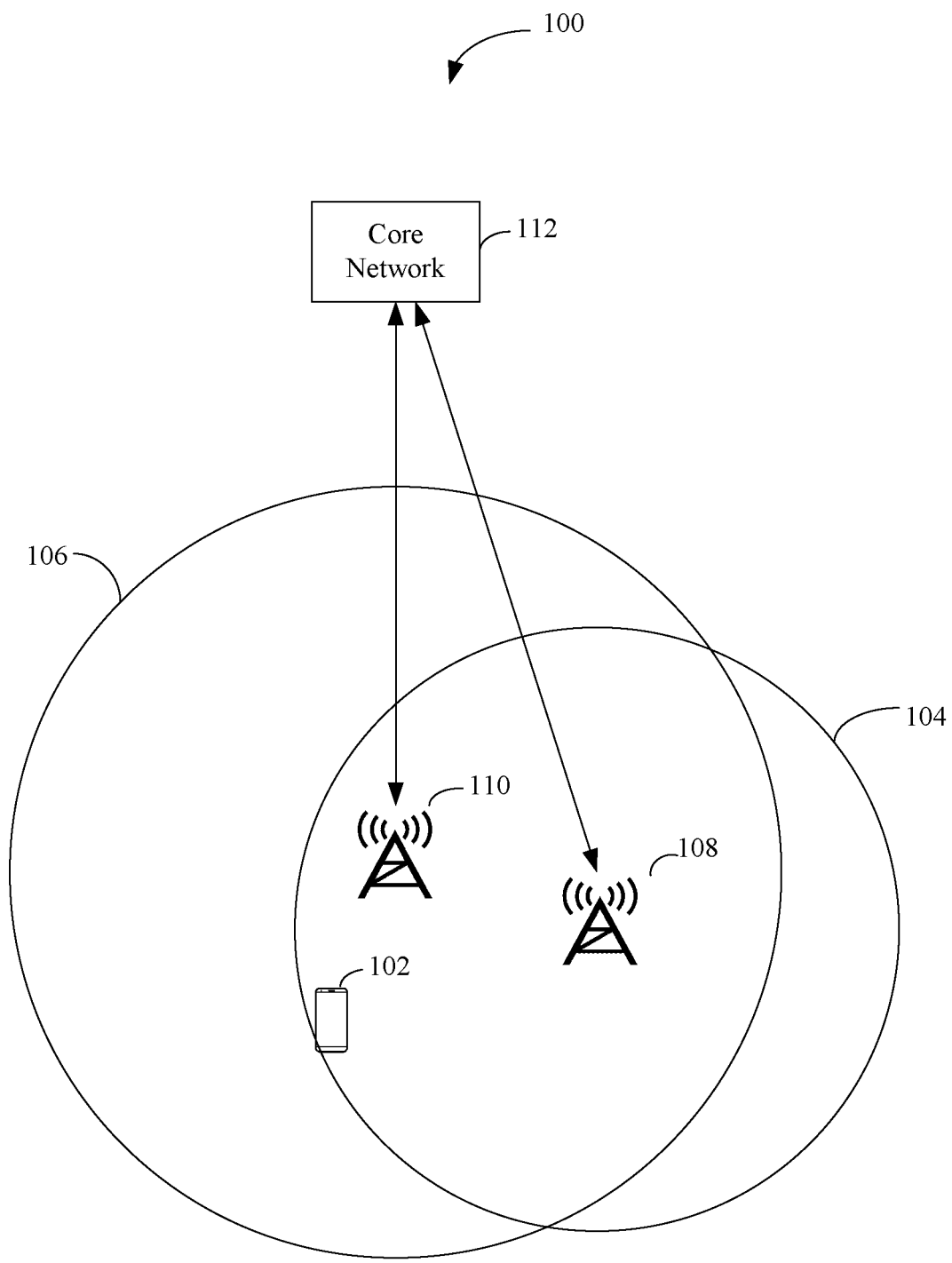
FIG. 1 is a schematic diagram of one embodiment of a wireless communication system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a wireless communication system 100. The system 100 comprises a user equipment (UE) 102, a first wireless cell 104, a second wireless cell 106, a first base station (BS) 108 managing the first wireless cell 104, and a second BS 110 managing the second wireless cell 106. In one embodiment, the first wireless cell 104 is a new radio (NR) cell, and the first BS 108 is a serving gNB of the UE 102. The second wireless cell is a 4G-LTE cell, and the second BS 110 is a target eNB near the UE 102. The system 100 further comprises a core network 112 in communication with the first BS 108 and the second BS 110. A handover may occur in the system 100 when the UE 102 is being served by the first BS 108 (or the second BS 110).

Figure 2:
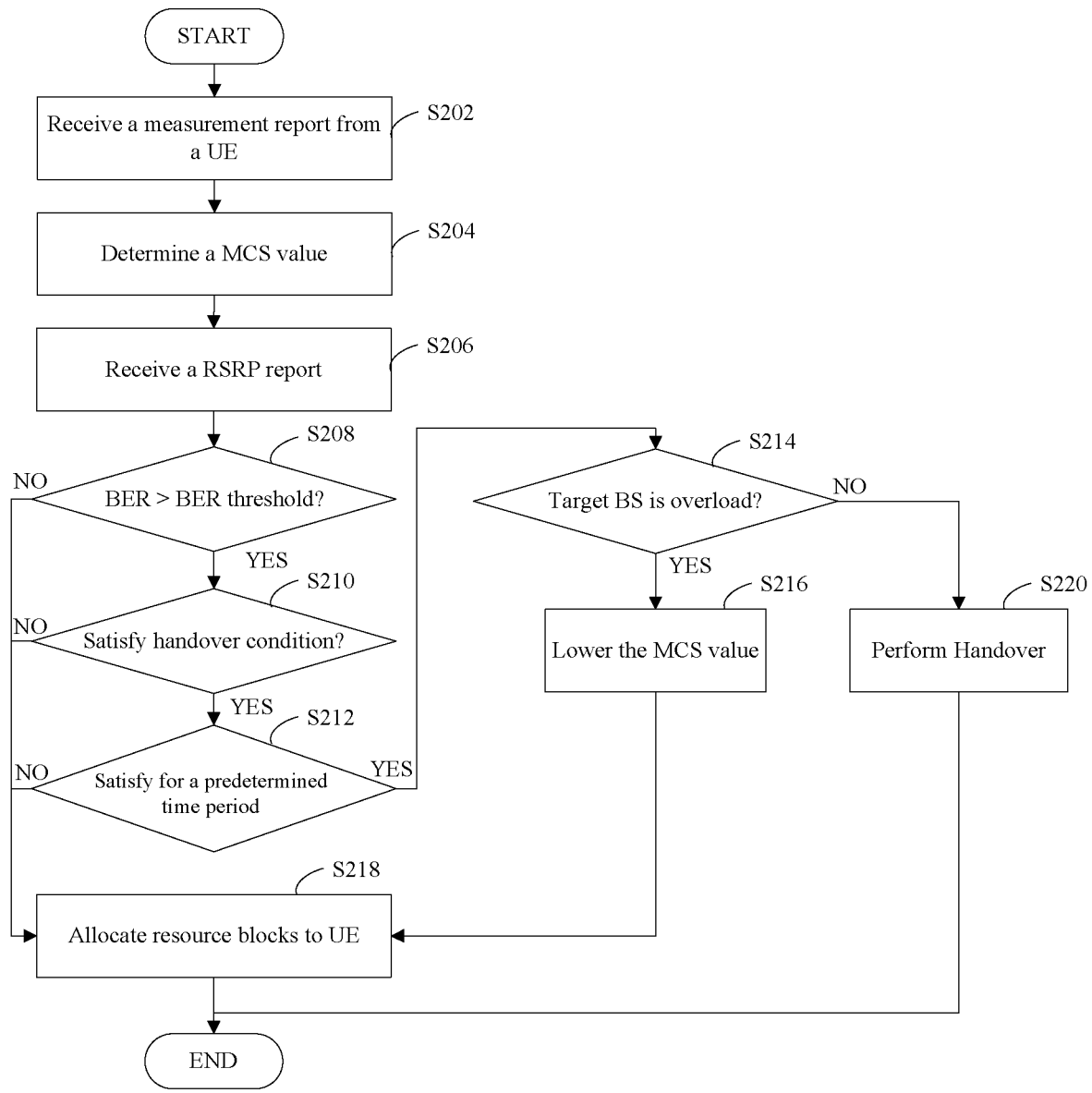
FIG. 2 is a flow chart of one embodiment of a method for managing handovers in the wireless communication system.

FIG. 2 illustrates a flow chart of one embodiment of a method for managing handover in the system 100. It should be known the order of processing steps of the embodiment may be changed as long as there is no contradiction. For the method shown in FIG. 2, elements of various steps are presented in an exemplary order. The order is not limited to the presented specific order.

Step S202, the serving BS (for example, the first BS 108 in FIG. 1) receives a measurement report from a UE (for example, the UE 102 in FIG. 1). The measurement report comprises a channel quality indicator (CQI) and a bit error rate (BER). In one embodiment, the UE calculates the BER by dividing a number of erroneous bits by a number of total bits received during a certain time period. In one embodiment, the UE transmits the measurement report in a periodic reporting mode and an aperiodic reporting mode. In the periodic reporting mode, the UE periodically transmits the measurement report according to a time period configured by the serving BS. In the aperiodic mode, the UE is triggered by the serving BS using trigger signaling to transmit the measurement report. In another embodiment, the measurement report comprises the BER only. The measurement report is sent along with a channel quality indication (CQI) report by the UE in the periodic reporting mode and the aperiodic reporting mode.

Step S204, the serving BS determines a modulation and coding scheme (MCS) value based on the received CQI. A formula or a mapping table can be used to obtain the MCS value based on the received CQI.

Step S206, the serving BS receives a reference signal received power (RSRP) report from the UE. The RSRP report comprises a RSRP of the serving BS and a RSRP of a target BS (for example, the second BS 110 in FIG. 1).

Step S208, the serving BS determines whether the received BER is greater than a predetermined BER threshold. If the serving BS determines that the received BER is greater than the predetermined BER threshold, step S210 is executed; otherwise, step S218 is executed. In one embodiment, the BER of any UE should be maintained below the predetermined BER threshold. In the embodiment, the predetermined BER threshold can be configured as, for example, 10% (i.e., 0.1).

Step S210, the serving BS determines whether the UE satisfies a handover condition. In one embodiment, the serving BS determines whether the UE satisfies a handover condition based on the received RSRP report, the handover condition being that the RSRP of the target BS is greater than the RSRP of the serving BS plus a handover threshold. In one embodiment, the RSRP report is transmitted to the serving BS by the UE when the UE satisfies the handover condition. In one embodiment, the serving BS determines whether the UE satisfies the handover condition using the following formula:

$$RSRP_T > RSRP_S + HO_{TH},$$

Wherein $RSRP_T$ represents the RSRP of the target BS, $RSRP_S$ represents the RSRP of the serving BS, and $HO_{TH}$ represents the handover threshold.

If the serving BS determines that the UE satisfies the handover condition, step S212 is executed; otherwise, step S218 is executed.

Step S212, the serving BS determines whether the UE satisfies the handover condition for a predetermined time period. In one embodiment, the predetermined time period is configured as a time-to-trigger (TTT) value. If the serving BS determines that the UE satisfies the handover condition for a predetermined time period, the step S214 is executed; otherwise, step S218 is executed. In one embodiment, the serving BS starts a timer to count the TTT value when the UE firstly satisfied the handover condition, and determines whether the UE maintains compliance with the handover condition before the timer for handover is expired. In operation, this step avoids ping pong handovers.

In one embodiment, both the $HO_{TH}$ and TTT value are configured based on empirical data. The operator tests the system 100, and determines the $HO_{TH}$ and the TTT value based on certain scenarios/operating conditions.

Step S214, the serving BS determines whether a current load of the target BS exceeds capacity. In one embodiment, the serving BS determines whether a current load of the target BS exceeds capacity based on load information reported by the target BS. The load information comprises radio resource occupation state of the target BS. In one embodiment, the load information comprises spectrum occupancy rate, number of served UEs, idle resource rate, and capacity corresponding to reserved resources. If the serving BS determines that the current load of the target BS is in excess of capacity, the step S216 is executed; otherwise the step S220 is performed.

Step S216, the serving BS lowers the MCS value.

Step S218, the serving BS allocates resource blocks to the UE based on the MCS value. In one embodiment, the serving BS looks up one or more tables to determine a transport block size and the number of resource blocks based on the MCS value. Such tables may be specified according to one or more LTE standards.

Step S220, the serving BS performs a handover procedure with the target BS for the UE. More specifically, the serving BS hands the UE over to the target BS.

Figure 3:
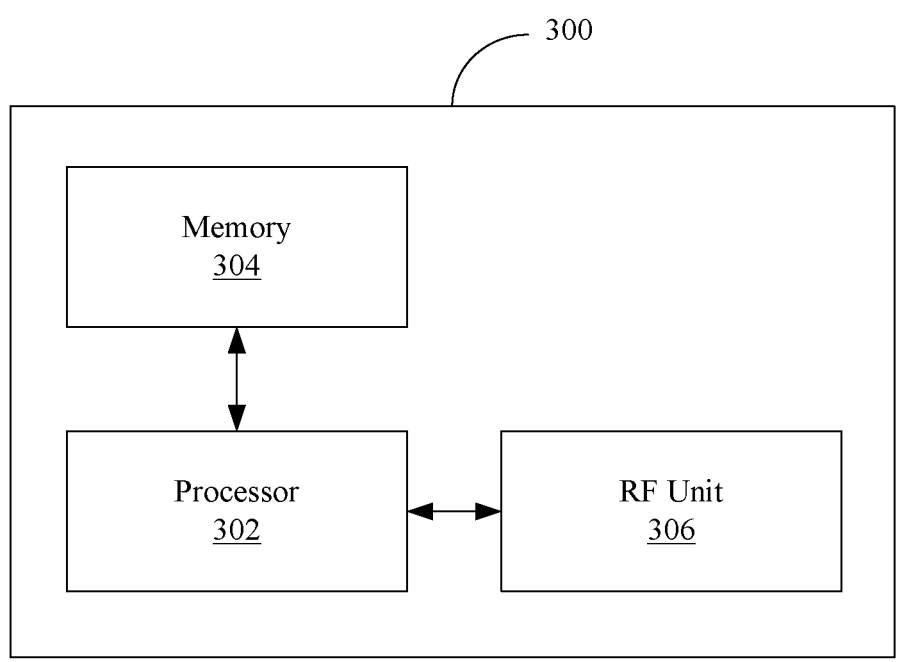
FIG. 3 is a block diagram of one embodiment of an apparatus for managing handovers in the wireless communication system.

FIG. 3 illustrates an apparatus 300 for managing handovers. The apparatus 300 comprises a processor 302, a memory 304, and a radio frequency (RF) unit 306. The processor 302 comprises a microcontroller, a microprocessor, a complex instruction set arithmetic microprocessor, a reduced instruction set arithmetic microprocessor, an ultra-long instruction set microprocessor, an ultra-parallel instruction set arithmetic microprocessor, and a digital signal processor or another circuit with computational processing capabilities. The processor 302 implements the method disclosed. The memory 304 comprises a read-only memory (ROM), a random access memory (RAM), a magnetic storage medium device, an optical storage medium device, a flash memory device, an electrical, optical, or other computer-readable storage medium device which is physical/tangible and is non-transitory. The memory 304 is coupled with the processor 302 to store one or more computer programs that control the operation of the apparatus 300, and the programs are executed by the processor 302. The RF unit 306 is coupled with the processor 302 to transmit and/or receive radio signals.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for managing handovers in a wireless communication system, the method comprising:
   receiving, by a serving base station (BS), a measurement report from an user equipment (UE), wherein the measurement report comprises a channel quality indicator (CQI) and a bit error rate (BER);
   determining, by the serving BS, whether the received BER is greater than a predetermined BER threshold;
   determining, by the serving BS, whether the UE satisfies a handover condition when the received BER is greater than the predetermined BER threshold;
   determining, by the serving BS, whether the UE satisfies the handover condition for a predetermined time period when the UE satisfies the handover conditions;
   determining, by the serving BS, whether a current load of a target BS exceeds capacity when the UE satisfies the handover condition for the predetermined time period;
   performing, by the serving BS, a handover procedure with the target BS for the UE when the current load of the target BS is not in excess of capacity;
   determining, by the serving BS, a modulation and coding scheme (MCS) value based on the received COI; and
   lowering, by the serving BS, the MCS value when the current load of the target BS is in excess of capacity.

2. The method of claim 1, wherein the method further comprises:
   allocating, by the serving BS, resource blocks to the UE based on the MCS value when the current load of the target BS is in excess of capacity.

3. The method of claim 1, wherein the method further comprises:
   receiving, by the serving BS, a reference signal received power (RSRP) report, wherein the RSTP report comprises a RSRP of the serving BS and a RSRP of the target BS.

4. The method of claim 3, wherein the handover condition further comprises the RSRP of the target BS is greater than the RSRP of the serving BS plus a handover threshold.

5. A serving base station (BS) for managing handovers for an user equipment (UE) in a wireless communication system, comprising: a memory storing instructions; and a processor coupled to the memory and, when executing the instructions, configured for:
- receiving a measurement report from the UE, wherein the measurement report comprises a channel quality indicator (CQI) and a bit error rate (BER);
- determining whether the received BER is greater than a predetermined BER threshold;
- determining whether the UE satisfies a handover condition when the received BER is greater than the predetermined BER threshold;
- determining whether the UE satisfies the handover condition for a predetermined time period when the UE satisfies the handover conditions;
- determining whether a current load of a target BS exceeds capacity when the UE satisfies the handover condition for the predetermined time period;
- performing a handover procedure with the target BS for the UE when the current load of the target BS is not in excess of capacity;
- determining a modulation and coding scheme (MCS) value based on the received COI; and
- lowering the MCS value when the current load of the target BS is in excess of capacity.

6. The serving BS of claim 5, wherein the processor is further configured for:
- allocating resource blocks to the UE based on the MCS value when the current load of the target BS is in excess of capacity.

7. The serving BS of claim 5, wherein the processor is further configured for:
- receiving a reference signal received power (RSRP) report, wherein the RSTP report comprises a RSRP of the serving BS and a RSRP of the target BS.

8. The serving BS of claim 7, wherein the handover condition further comprises the RSRP of the target BS is greater than the RSRP of the serving BS plus a handover threshold.

* * * * *